(12) United States Patent
Fischer

(10) Patent No.: US 7,818,989 B2
(45) Date of Patent: Oct. 26, 2010

(54) DEVICE AND METHOD FOR CHECKING AND/OR CALIBRATING A PASSENGER RECOGNITION DEVICE ARRANGED IN A VEHICLE SEAT

(75) Inventor: Thomas Fischer, Wenden (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/482,508

(22) Filed: Jun. 11, 2009

(65) Prior Publication Data

US 2009/0249857 A1  Oct. 8, 2009

Related U.S. Application Data

(62) Division of application No. 11/158,748, filed on Jun. 22, 2005, now Pat. No. 7,574,892.

(30) Foreign Application Priority Data

Jun. 24, 2004  (EP) .................................. 04014871

(51) Int. Cl.
*G01F 25/00* (2006.01)
(52) U.S. Cl. .......................... 73/1.08; 73/1.13; 700/261
(58) Field of Classification Search ......... 73/1.08–1.11, 73/1.13, 1.15; 700/245, 260–261; 701/45; 901/14
See application file for complete search history.

(56) References Cited

U.S. PATENT DOCUMENTS

| | | | |
|---|---|---|---|
| 4,908,777 A | 3/1990 | Wolfe | |
| 5,753,834 A | 5/1998 | Stewart | |
| 6,020,812 A | 2/2000 | Thompson et al. | |
| 6,479,766 B2 | 11/2002 | Gray et al. | |
| 6,539,771 B1 | 4/2003 | Davidson et al. | |
| 6,629,445 B2 | 10/2003 | Yamanaka et al. | |
| 6,823,959 B2 | 11/2004 | Winkler et al. | |
| 6,832,503 B2 | 12/2004 | Marentic et al. | |
| 6,851,296 B2 | 2/2005 | Seifert et al. | |
| 6,937,143 B2 | 8/2005 | Ohtaka | |
| 6,957,168 B2 * | 10/2005 | Tanabe et al. ............... 702/173 |
| 6,985,077 B2 | 1/2006 | Nathan et al. | |
| 7,046,158 B2 | 5/2006 | Saunders et al. | |
| 7,363,184 B2 | 4/2008 | Hibner et al. | |
| 2002/0002854 A1 | 1/2002 | Imoto et al. | |
| 2002/0066302 A1 | 6/2002 | Hamm et al. | |
| 2003/0040858 A1 | 2/2003 | Wallace | |
| 2003/0120379 A1 | 6/2003 | Mehlberg et al. | |

* cited by examiner

*Primary Examiner*—Thomas P Noland
(74) *Attorney, Agent, or Firm*—Thomas N. Twomey

(57) ABSTRACT

The invention relates to a device and a method for checking and/or calibrating a passenger recognition device arranged in a vehicle seat, in the case of which device a child's seat can be pressed against a vehicle seat and in the case of which method a vehicle seat is loaded with a child's seat and a corresponding reaction from the passenger recognition device in the vehicle seat is evaluated.

6 Claims, 3 Drawing Sheets

DEVICE AND METHOD FOR CHECKING AND/OR CALIBRATING A PASSENGER RECOGNITION DEVICE ARRANGED IN A VEHICLE SEAT

TECHNICAL FIELD

This is a division of U.S. patent application Ser. No. 11/158,748, filed Jun. 22, 2005.

The invention relates to a device and a method for checking and/or calibrating a passenger recognition device arranged in a vehicle seat, in the case of which device a child's seat can be pressed against a vehicle seat and in the case of which method a vehicle seat is loaded with a child's seat and a corresponding reaction from the passenger recognition device in the vehicle seat is evaluated.

BACKGROUND OF THE INVENTION

The checking and/or calibration of a passenger recognition device arranged in a vehicle seat is generally well known. The objective of checking is to find out whether the passenger recognition device correctly detects occupation of the vehicle seat, by a child seated in a child's seat in the present case. If this is not the case the passenger recognition device can be suitably corrected.

Problems here are that the passenger recognition device must not only recognise numerous structurally different child's seats but also that recognition must reliably ensue for different installation positions of a child's seat, different fastenings of the child's seat and occupation of the child's seat by children of different weights.

The checking and/or calibration of the passenger recognition device usually takes place by placing a child's seat on a vehicle seat arranged in a car body and fastening it to the latter by means of a safety belt. A corresponding reaction from the passenger recognition device is measured and evaluated for different belt tensions, installation positions and occupation of the child's seat with different dummies.

This procedure can be carried out with further child's seats and be repeated on a plurality of vehicle seats in order to draw up a test matrix comprising all available child's seats and vehicle seats on the basis of which the operation of the passenger recognition device for the cases substantially occurring in practice is assessable or adjustable.

Since the tests are carried out manually a problem arises with the reliability and reproducibility of the individual tests. Furthermore, the drawing up of the test matrix is very time-consuming. Since, in addition, a belt system as found in practice is necessary for setting the belt tensions, at least one substantially completely equipped motor vehicle is required for carrying out the test series. This in turn imposes an increased requirement for space for the test set-up. In order to carry out the test series under controlled extreme environmental conditions it is additionally necessary to have spacious climatic chambers for accommodating the motor vehicles.

SUMMARY OF THE INVENTION

It is an object of the invention to provide a device and a method which allow accelerated checking and/or calibration of a passenger recognition device arranged in a vehicle seat and in particular provide reliable and reproducible results.

The device according to the invention comprises a child's seat depot for storing at least one child's seat, a vehicle seat mounting for accommodating at least one vehicle seat and a robot by means of which a child's seat stored in the child's seat depot can be removed and pressed onto a vehicle seat held in the vehicle seat mounting.

By using a robot for removing the child's seat from the child's seat depot and pressing the same onto the vehicle seat the checking and/or calibration of the passenger recognition device can ensue in fully automated manner. Accordingly, the carrying out of one or more series of tests or the drawing up of a test matrix covering different child's seats, vehicles, installation positions, belt tensions and occupancies of child's seats is not only particularly rapid but can also be carried out reliably and above all reproducibly.

By pressing the child's seat onto the vehicle seat with the aid of the robot any belt tensions and occupancies of the child's seat can generally be simulated. A belt system for fastening the child's seat to the vehicle seat is not necessary. For that reason it is not necessary according to the invention to have a complete motor vehicle for checking and/or calibration of the passenger recognition device. On the contrary, a free-standing vehicle seat held in the vehicle seat mounting is sufficient for carrying out the tests. As a result of this the space required for the device according to the invention is considerably reduced.

Advantageous embodiments of the invention are described in the subsidiary claims, the description and the drawing.

Thus, according to an advantageous embodiment any child's seat can be pressed down on any vehicle seat and/or with differing force on the latter to simulate possible installation positions and/or seat occupancies of the child's seat in various predetermined relative positions. In this fashion substantially all installation possibilities or occupancies of the child's seat occurring in practice can be simulated by the robot and taken into consideration in the checking and/or calibration of the passenger recognition device.

Preferably, the vehicle seat can have applied to it at least one predetermined force/torque combination corresponding to a defined combination of occupancy of the child's seat and tensions which occur on securing the child's seat on the vehicle seat in a belt used for securing. Accordingly, combinations of seat occupancy and belt tensions occurring in practice are converted into force/torque combinations which the robot can correspondingly exert on the vehicle seat. In this fashion combinations of seat occupancies and belt tensions actually occurring can be exactly simulated by the robot.

For different child's seats in each case at least one, in particular vehicle-seat-dependent, force/torque combination can be stored in a memory unit. Since a very large number of different child's seats exist which differ inter alia in their size and in the manner in which they are fastened to the vehicle seat the belt tensions typically occurring can vary markedly depending on the child's seat. By storing at least one force/torque combination for each type of child's seat to be tested this wide variety of child's seats can be taken into account and even higher reliability and reproducibility of the test results achieved.

Moreover, details of the geometry of every child's seat stored in the child's seat depot and/or details of the geometry of every vehicle seat accommodated in the vehicle seat mounting can also be stored in a memory unit. This allows account to be taken of the structural configuration of the child's seats and vehicle seats and hence still better simulation of the installation positions and possibilities for fastening the child's seat to the vehicle seat. By this means the reliability and reproducibility of the checking and/or calibration of the passenger recognition device are increased even more.

Preferably, the robot possesses a coupling/sensor head for coupling the robot to the child's seat and for measuring forces and torques which occur when the child's seat is pressed onto the vehicle seat. Accordingly, the coupling/sensor head not only provides a link between the robot and child's seat but also allows a check that the forces and torques to be exerted on the vehicle seat are exactly adhered to, by which means still higher reliability and reproducibility of the test results are achieved.

Each child's seat can possess a flange for coupling to the robot. This allows the robot to link up with any child's seat in the child's seat depot and to withdraw it in simple manner from the depot.

Preferably the child's seat depot and/or the vehicle seat mounting are arranged around the robot in the form of at least an arc of a circle. Furthermore, the working range of the robot can encompass 360°. Accordingly, the child's seat depot and the vehicle seat mounting can form an approximation to a circle in whose centre the robot is arranged. In this configuration the robot can reach any child's seat in the child's seat depot by appropriate rotation and by appropriate extension of a robot arm and place it on top of any vehicle seat. Due to the approximately circular arrangement of the child's seat depot and the vehicle seat mounting the space required by the device is minimised.

The child's seat depot can comprise a shelving installation for accommodating a large number of child's seats. Thus, the child's seats are not only stored alongside one another in a row but also in a plurality of rows stacked on top of one another. This allows the accommodation of a large number of child's seats on a comparatively small space.

Preferably, a plurality of vehicle seats are detachably fastenable to the vehicle seat mounting. The simultaneous mounting of a plurality of vehicle seats allows particularly rapid and hence time-saving checking and/or calibration of the passenger recognition devices in a plurality of vehicle seats. Due to the fact that the vehicle seats are detachably fastenable to the vehicle seat mounting it is additionally possible for vehicle seats which have already been tested to be readily exchanged for other vehicle seats which still have to be tested.

Due to the method according to the invention and the embodiments thereof the advantages identified above are correspondingly achieved.

BRIEF DESCRIPTION OF THE DRAWINGS

The present invention is described below purely by way of example on the basis of an advantageous embodiment with reference to the attached drawing. This shows.

DESCRIPTION OF THE PREFERRED EMBODIMENT

Figure 1:
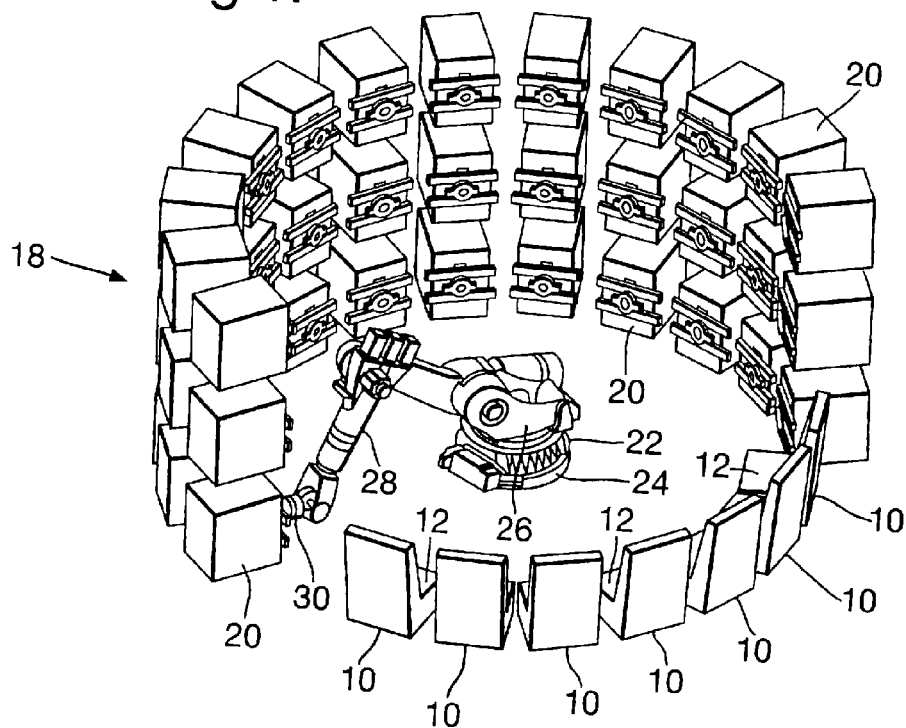
FIG. 1 is a view in perspective of a device according to the invention.
Figure 2:
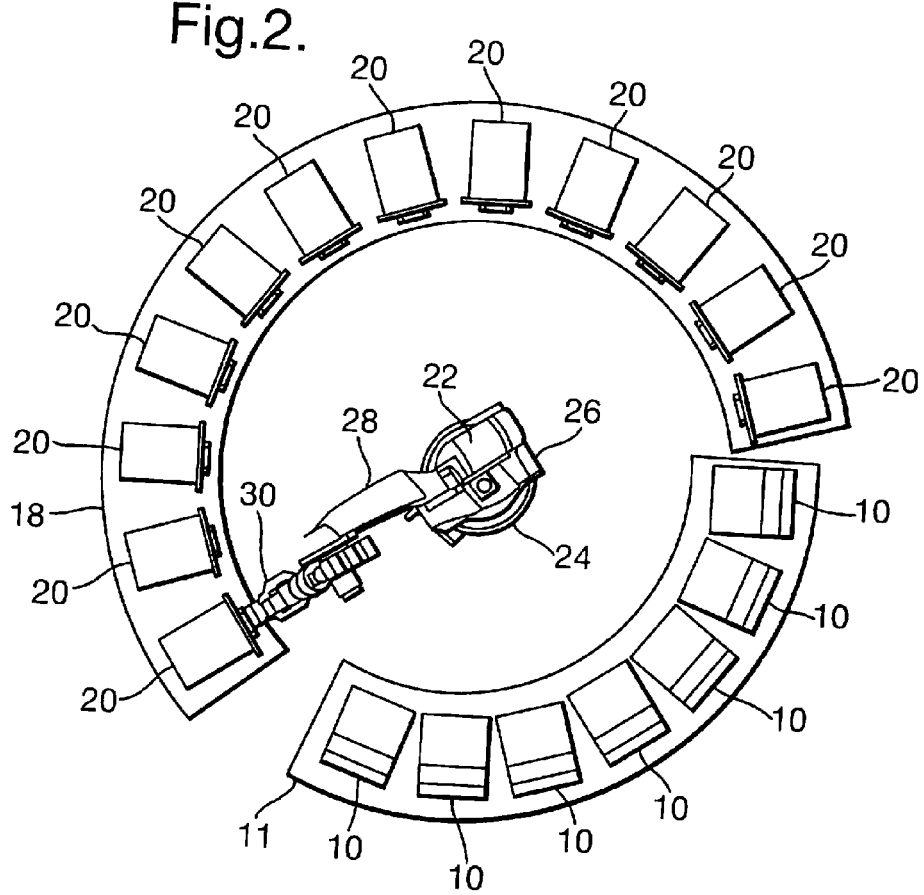
FIG. 2 is a plan view onto the device in FIG. 1.

In FIGS. 1 and 2 a device according to the invention for checking and/or calibrating a passenger recognition device in a vehicle seat 10 is illustrated. The device comprises a vehicle seat mounting 11, which is not shown, for mounting a plurality of vehicle seats 10. In the present example the vehicle seat mounting 11 is deigned for accommodating a maximum of seven vehicle seats 10. It is, however, equally possible to construct the vehicle seat mounting 11 in such a way that it can accommodate more than seven vehicle seats 10 or to make it of correspondingly smaller size. It is of course also possible in the exemplified embodiment illustrated in FIGS. 1 and 2 to fit the vehicle seat mounting 11 with less than the maximum number of seven vehicle seats 10.

The vehicle seats 10 accommodated by the vehicle seat mounting 11 are arranged in a row. In this case the row of vehicle seats 10 is curved in such a way that the vehicle seats 10 form a segment of a circle whose angle in the exemplified embodiment in the illustration is approximately 110°. Depending on the number of vehicle seats 10 or the curvature of the row of vehicle seats the angle described by the vehicle seats 10 may also be greater or less than 110°.

The vehicle seats 10 in the illustrated exemplified embodiment are differently equipped seats of a model series or different types of vehicle seats. It is also conceivable, however, to have an arrangement of two or more vehicle seats of the same type in a row in order to verify the measurements described in more detail below.

The vehicle seats 10 are detachably connected to the vehicle seat mounting 11. In doing so the mechanism for fastening the vehicle seats 10 to the vehicle seat mounting 11 is constructed in such a way that, on the one hand, the vehicle seats 10 are held securely and in an exactly specified position in the vehicle seat mounting 11 and, on the other hand, they can be easily detached from the vehicle seat mounting 11 in order to allow rapid exchange of vehicle seats. Each vehicle seat 10 can be provided by way of example with a flange or adapter which is fixable by means of a screw or interlocking joint to a correspondingly constructed mating flange or mating adapter on the vehicle seat mounting 11.

Figure 3:
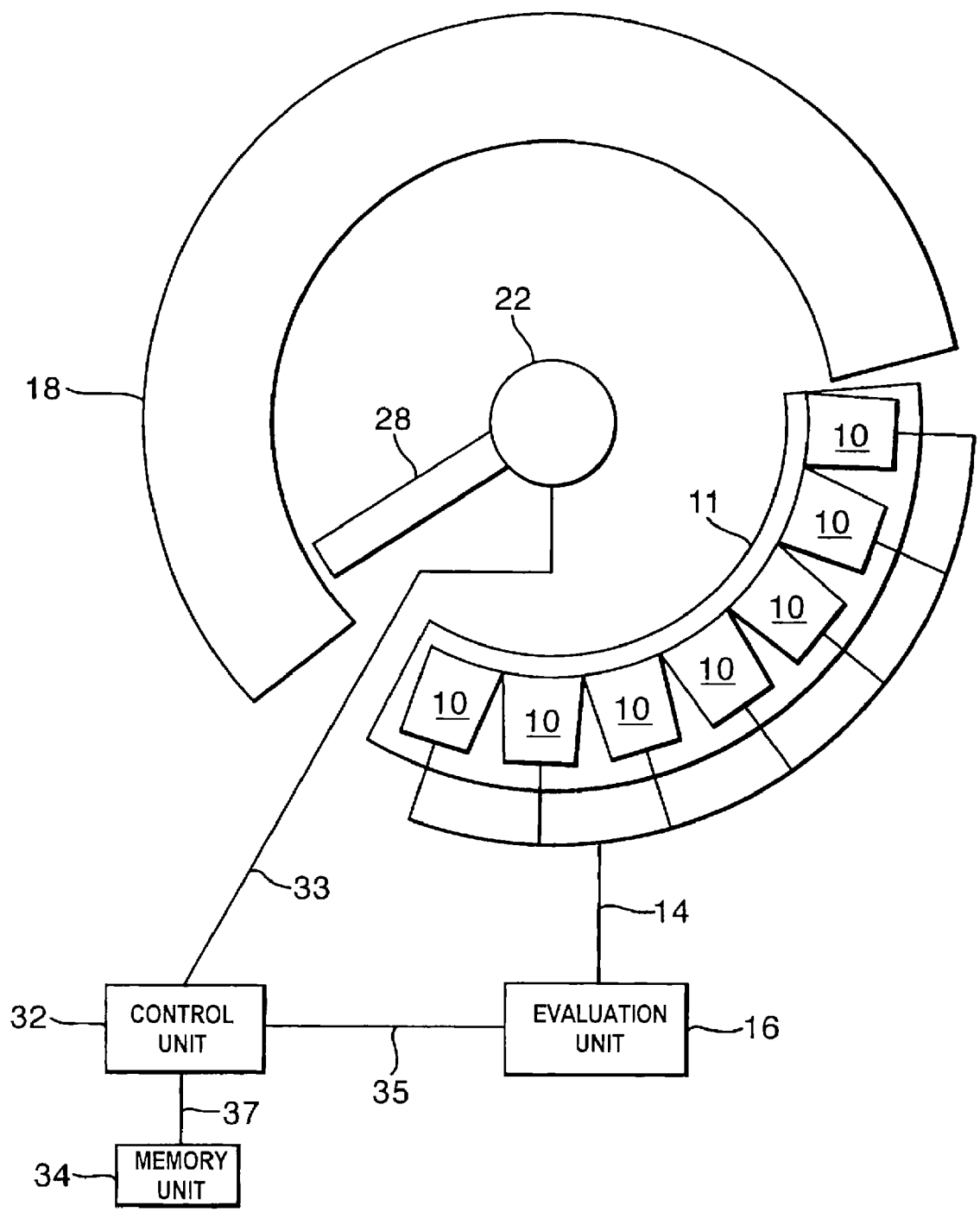
FIG. 3 is a schematic plan view of the device in FIG. 1.

Each vehicle seat 10 is further provided with a passenger recognition device to be checked and/or to be calibrated comprising a pressure sensor mat arranged in the region of the seat cushion 12 of the vehicle seat 10. The passenger recognition device in each vehicle seat 10 communicates via a cable 14 with an evaluation unit 16 (FIG. 3) which allows evaluation of the measured values determined by the passenger recognition device in question.

As can be seen in FIGS. 1 and 2 the device according to the invention further comprises a child's seat depot 18 for storing a large number of child's seats 20. The child's seat depot 18 comprises a shelving installation in which the child's seats are accommodated in a plurality of rows alongside one another and on top of one another. In the exemplified embodiment illustrated the shelving installation in the child's seat depot has three rows of twelve child's seats 20 each arranged on top of one another, hence it can accommodate a maximum of 36 child's seats 20. It is of course not necessary to fully utilise the capacity of the child's seat depot 18, ie fewer than 36 child's seats may also be accommodated in the child's seat depot 10. Conversely, it is equally possible to provide a child's seat depot 18 having a greater capacity, designed for example for several hundred child's seats 20.

The child's seat depot 18 is curved and forms a segment of a circle arranged opposite the row of vehicle seats. The angle of the segment of a circle formed by the child's seat depot 18 amounts to a little more than 180° and its radius of curvature is a little greater than the radius of curvature of the row of vehicle seats. In the exemplified embodiment illustrated the child's seat depot 18 and the row of vehicle seats 10 forms an approximation of circle which is almost closed.

Arranged at about the centre of this circle is a robot 22 comprising a pedestal section 24 fixedly anchored to the floor and an operating section 26 which is rotatable about a vertical axis by 360° relative to the pedestal section 24. In other words the robot 22 covers a working range of 360°. The operating section 22 comprises a robot arm 28 which is freely movable in a vertical plane and on whose free end a coupling/sensor head 30 which is freely movable in all spatial directions is arranged.

The coupling/sensor head 30 is used for coupling the robot 22 to the child's seats 20 accommodated in the child's seat depot 18 in order to withdraw these from the child's seat depot 18. For this purpose both the coupling/sensor head 30 and the child's seats 20 are equipped with corresponding flanges or adapters. The coupling/sensor head 30 further comprises a load cell for measuring forces and torques which arise when the robot 22 loads a vehicle seat 10 with a child's seat 20 as described in more detail below.

For control of the robot 22 a control unit 32 is provided which is connected to the robot 22 via a cable 33. The control unit 32 not only serves for the mechanical control of the robot 22 but also communicates with the coupling/sensor head 30 in order to receive and evaluate the data measured by the load cell in the coupling/sensor head 30. In order to take the measured data from the load cell into account when checking or calibrating the passenger recognition devices the control unit 32 is connected by a cable 35 to the evaluation unit 16 (see FIG. 3).

According to the invention the checking or calibration of the passenger recognition devices arranged in the vehicle seats 10 proceeds automatically. Controlled by the control unit 32 the robot 22 by means of its coupling/sensor head 30 withdraws a first child's seat 20 from the child's seat depot 18 and presses it onto the seat cushion 12 of a first vehicle seat 10. After this the robot 22 presses the same child's seat 20 onto a second vehicle seat 10, then onto a third vehicle seat 10, etc until loading of all the vehicle seats 10 held in the vehicle seat mounting 11 has taken place. The robot 22 then puts the child's seat 20 back into the child's seat depot 18 at the position assigned to it and withdraws a second child's seat 20 which is likewise successively set up on each vehicle seat 10. This procedure is repeated until each vehicle seat 10 has been loaded at least once by each child's seat 20 in the child's seat depot 18.

Instead of initially placing a child's seat 20 removed from the child's seat depot 18 on all vehicle seats 10 as described above and only then withdrawing the next child's seat 20 from the depot 18 it is also possible in principle to withdraw all of the child's seats 20 in sequence from the child's seat depot 18 and to place them first of all on a first vehicle seat 10, then to place all of the child's seats 20 on the second vehicle seat 10, etc. This procedural sequence, however, proves to be substantially more time-consuming than that described above.

The pressing of the child's seats 20 onto the vehicle seats 10 takes place for each child's seat 20 and each vehicle seat 10 according to an exactly defined scheme. For this purpose information about the geometry of each child's seat 20 and each vehicle seat 10 and about the forces and torques occurring in practice in each possible combination of child's seat 20 and vehicle seat 10, or at least those to be tested, is stored in a memory unit 34 connected by a cable 37 to the control unit 28, which information can be retrieved from the memory unit 34 by the control unit 32 to control the robot 22.

In this way the robot 22 can put each child's seat 20 down on each vehicle seat 10 with a force/torque combination exactly matching the forces $F_1$ to $F_4$ (see FIG. 4) which occur when the child's seat 20 is fastened to the vehicle seat and when there is a certain occupancy of the child's seat 20 as forces in a safety belt 36 and as the force due to gravity. Thus, due to the loading of the vehicle seat 10 with a certain combination of force and torque by the robot 22 a certain occupancy of the child's seat 20 and a certain tensioning of the safety belt 36 is simulated in each case. The determination of the force/torque combinations is described in more detail below.

Since it is scarcely possible in practice constantly to use a child's seat 20 in such a way that the same forces $F_1$ to $F_3$ always appear in the safety belt 36 and there is always the same seat occupancy $F_4$ the memory unit 34 includes for each child's seat 20 and for each combination of child's seat 20 and vehicle seat 10 an ensemble of several force/torque combinations which are worked through when the child's seat 20 in question is set up on the corresponding vehicle seat 10. In doing so the fastening position of the child's seat 20 on the vehicle seat 10 can also be taken into account.

In this way it is possible for every child's seat/vehicle seat combination to run through tests on a large number of seat occupancy states and fastening variants of the child's seat 20 on the vehicle seat 10 which are possible in practice, which number may be several 1,000 or even more. Due to the fact that the method according to the invention is controlled by robot, ie ensues automatically, the planned test conditions despite their large number can be carried out quickly, reliably and reproducibly.

While the robot 22 presses a child's seat 20 onto a vehicle seat 10 the force and torque exerted by the robot 22 measured by the load cell provided in the coupling/sensor head is compared with the specified force/torque combination called up by the control unit 28 from the memory unit 34 and in the event of any deviation suitably adapted.

The measured values recorded by the pressure sensor mat in the passenger recognition device for each combination of child's seat 20 and vehicle seat 10 are evaluated in the evaluation unit 16 and correlated with the correspondingly exerted force/torque combination. As has already been mentioned the evaluation unit 16 is connected for this purpose to the control unit 32 of the robot 22. The control unit 32, the memory unit 34 and the evaluation unit 16 can be combined in a central computing unit.

The evaluation unit 16 determines the force/torque combinations for which the passenger recognition device correctly detects occupancy of the vehicle seat 10 and for which it does not. In the event of defective functioning of the passenger recognition device the latter can be suitably modified. Alternatively or additionally, calibration of the passenger recognition device as a whole can be carried out.

Figure 4:
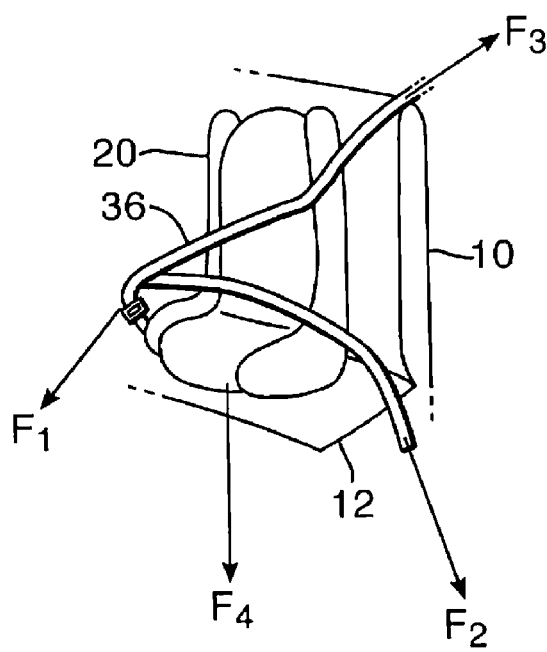
FIG. 4 is a child's seat fastened to a vehicle seat by means of a safety belt together with the tensions occurring in the safety belt and the force due to gravity.
Figure 5:
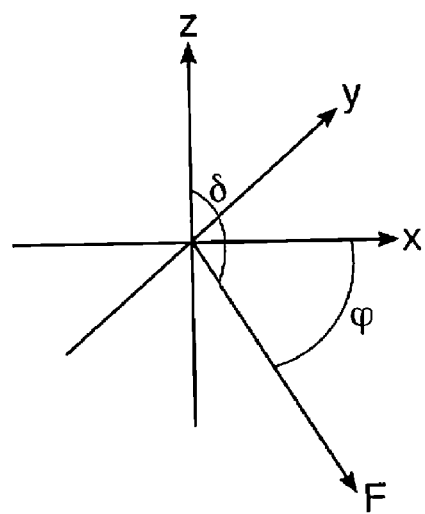
FIG. 5 is a coordinate system for the mathematical depiction of the forces illustrated in FIG. 4.

To determine the force/torque combinations stored in the memory unit 34 for a certain child's seat/vehicle seat pair the corresponding child's seat 20 is placed on the corresponding vehicle seat 10 and fastened under near practical conditions by a safety belt 36 to the vehicle seat 10 as illustrated in FIG. 4. In addition a dummy may be positioned in the child's seat 20 in order to simulate occupancy of the child's seat by a certain weight. Preferably, the child's seat 20 is fastened in different relative positions with respect to the vehicle seat 10 together with different degrees of tightening of the safety belt 36 and dummies of different weights. For each of these cases the tensions $F_1$ to $F_3$ occurring in the safety belt 36 and the force due to gravity $F_4$ are measured and represented mathematically in accordance with the coordinate system shown in FIG. 5.

From the forces $F_1$ to $F_4$ measured for each occupancy and fastening state of the child's seat 20 a resultant force F and a resultant torque M acting on the centre of gravity of the child's seat 20 can be calculated on the basis of the following equations:

$$\vec{F} = \sum \vec{F}_i = \sum \begin{pmatrix} f_x \\ f_y \\ f_z \end{pmatrix} \quad \text{[equation 1]}$$

$$\overline{M} = \sum \overline{M}_i = \sum \vec{r}_i \times \vec{F}_i = \sum \begin{pmatrix} r_x \\ r_y \\ r_z \end{pmatrix}_i \times \begin{pmatrix} f_x \\ f_y \\ f_z \end{pmatrix}_i, \quad \text{[equation 2]}$$

where the vectors $F_i$ each represent the forces $F_1$ to $F_4$ and the vectors $r_i$ each represent the position of the forces $F_1$ to $F_4$ relative to the centre of gravity of the child's seat 20.

Once the combinations of resultant forces and torques have been determined they are stored in the memory unit 34. There they remain available for later accesses by the control unit 32 of the robot 22 and in this way allow any desired number of automatic checks or calibrations of the passenger recognition devices.

Optimum simulation of all possible force/torque combinations for all possible child's seat/vehicle seat combinations is achieved by determining all force/torque combinations coming into question for each possible child's seat/vehicle seat combination. In order to reduce the expenditure of time associated with determining the force/torque combinations and also the duration of the later checking or calibration procedure it is also possible, however, to subdivide the child's seats 20 and the vehicle seats 10 into classes of similar seats and for each of these classes to determine only a limited number of force/torque combinations.

The invention claimed is:

1. In a system comprising a child seat, a vehicle seat having a passenger recognition device, a robot for pressing the child seat against the vehicle seat, and an evaluation unit receiving a response from the passenger recognition device, a method for calibrating the passenger recognition device in the vehicle seat comprising the steps of:

actuating the robot to press the child seat against the vehicle seat while applying a predetermined combination of a force and a torque; and evaluating a measured value from the passenger recognition device based upon the combination of the force and the torque.

2. The method in accordance with claim 1, wherein the predetermined combination of the force and the torque is based upon a combination of a weight of an occupant in the child seat and a tension exerted on the child seat by a vehicle seat belt used for securing the child seat to the vehicle seat.

3. The method in accordance with claim 2, wherein actuating the robot applies a plurality of combinations of force and torque.

4. The method in accordance with claim 3, further comprising storing the plurality of combinations of forces and torques in a memory unit.

5. The method in accordance with claim 3, wherein the predetermined combination of the force and the torque is based upon a child seat geometry and a vehicle seat geometry.

6. The method in accordance with claim 1, wherein the system has a plurality of child seats and a plurality of vehicle seats, and wherein the method further comprises actuating the robot to select a first child seat from the plurality of child seats and pressing the first child seat against a vehicle seat and thereafter to select a second child seat from the plurality of child seats and press the second child seat against the vehicle seat.

* * * * *